United States Patent [19]
Le et al.

[11] Patent Number: 5,745,998
[45] Date of Patent: May 5, 1998

[54] PRUNING IMPLEMENT

[76] Inventors: Thong Huu Le, 3749 Stanford Dr., Oceanside, Calif. 92056; Timothy Van Le, 2038 Cranworth Cir., San Jose, Calif. 95121

[21] Appl. No.: 722,792

[22] Filed: Sep. 27, 1996

Related U.S. Application Data

[63] Continuation of Ser. No. 585,120, Jan. 11, 1996, abandoned.

[51] Int. Cl.⁶ ............................................. B26B 13/00
[52] U.S. Cl. .............................................. 30/249; 30/245
[58] Field of Search ................................. 30/244, 245, 246, 30/249

[56] References Cited

U.S. PATENT DOCUMENTS

| | | | |
|---|---|---|---|
| 247,128 | 9/1881 | Stanley | 30/249 |
| 527,116 | 10/1894 | Nash et al. | 30/249 |
| 596,890 | 1/1898 | Le Sage | 30/245 |
| 2,569,888 | 10/1951 | Gustafson | 30/249 |
| 3,835,535 | 9/1974 | Robinson et al. | 30/249 |
| 4,420,883 | 12/1983 | Wallace et al. | 30/251 |
| 4,649,646 | 3/1987 | Lemcke | 30/231 |
| 4,760,645 | 8/1988 | Davis | 30/249 |
| 5,020,222 | 6/1991 | Gosselin et al. | 30/251 |
| 5,084,975 | 2/1992 | Melter | 30/249 |
| 5,228,202 | 7/1993 | Liao | 30/249 |
| 5,241,752 | 9/1993 | Lutzke et al. | 30/249 |

FOREIGN PATENT DOCUMENTS

| | | | |
|---|---|---|---|
| 1089020 | 9/1954 | France | 30/249 |
| 110088 | 10/1917 | United Kingdom | 30/249 |

*Primary Examiner*—Hwei-Siu Payer
*Attorney, Agent, or Firm*—Edward Dreyfus, Esq.

[57] ABSTRACT

A portable pruner for cutting limbs comprising a hollow shaft having an longitudinal axis, a lower end and an open upper end. The slideable grip portion is slideable along the longitudinal axis between a first and a second position. A shearing mechanism is attached to the upper open end of the hollow handle and includes a body having a hook adapted to receive and hold a limb. A cutting blade is pivotally attached to the body and selectively pivots against the hook to cut the selected limb. The cutting blade pivots with respect to the hook and is responsive to movement of the slidable grip portion between the first and second positions.

22 Claims, 5 Drawing Sheets

PRUNING IMPLEMENT

This is a continuation of application Ser. No. 08/585,120, filed Jan. 11, 1996, now abandoned.

BACKGROUND OF THE INVENTION

1. Field of the Invention

This invention relates to cutting tools, and more particularly, to pruning shears having an extended handle for reaching branches at greater heights, and a cord for remotely activating a shearing mechanism.

2. Background and Related Art

Conventional tree pruning shears are typically provided with a pole of fixed length, a shearing mechanism located at one end of the pole, and an operating cable or cord attached to the shearing mechanism and extending the length of the pole for remote operation of the shearing mechanism.

The conventional shearing mechanism usually includes a capturing hook portion which is adapted to hang from a branch or limb intended to be cut, and a mating pivotal cutting blade. The cutting blade includes a leverage arm from which is attached one end of the operating cord. The pruning shears are manipulated by holding the pole in one hand and the operating cord in the other hand. A limb of interest is "hooked" and held by the hook portion of the shearing mechanism. The operating cord is then pulled which causes the cutting blade to pivot into the "captured" limb. The amount of force required to cut the limb varies, depending on the type of wood, the size of the limb and the location of the cut. However, for the most part, the cutting action requires a great deal of force from its operator.

In addition, generally the operating cord hangs freely outside the pole. During the cutting operating, the operating cord will frequently become snagged on other branches or twigs, reducing the cutting force, and requiring time and effort to untangle the operating cord.

While these other units may be suitable for the particular purpose for which they intended, or for general use, they would not be as suitable for the purposes of the present invention as described herein.

SUMMARY OF THE INVENTION

It is an object of the invention to provide a pruner which will effectively cut a branch with minimal effort.

It is another object of the invention to provide a pruner in which the possibility of snagging the operating cord is greatly reduced.

It is a further object of the invention that the cutting arm is operated by means of a leverage arm, and the leverage of the cutting arm is greatly increased by the dual-pivotal attachment of the leverage arm and cutting arm.

A portable pruner for cutting limbs comprising a hollow elongate handle having an longitudinal axis, a lower sliding portion and an upper open end. The sliding portion is slidable along the longitudinal axis between a first and a second position. A shearing mechanism is attached to the upper open end of the hollow handle and includes a body having a hook adapted to receive and hold a limb. A cutting blade is pivotally attached to the body and selectively pivots against the hook to cut the selected limb. The pruner includes means for pivoting the cutting blade with respect to the hook wherein the pivoting means is responsive to movement of the sliding portion between the first and second positions.

Other principal features and advantages of the invention will become apparent to those skilled in the art upon review of the following drawings, the detailed description and the appended claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
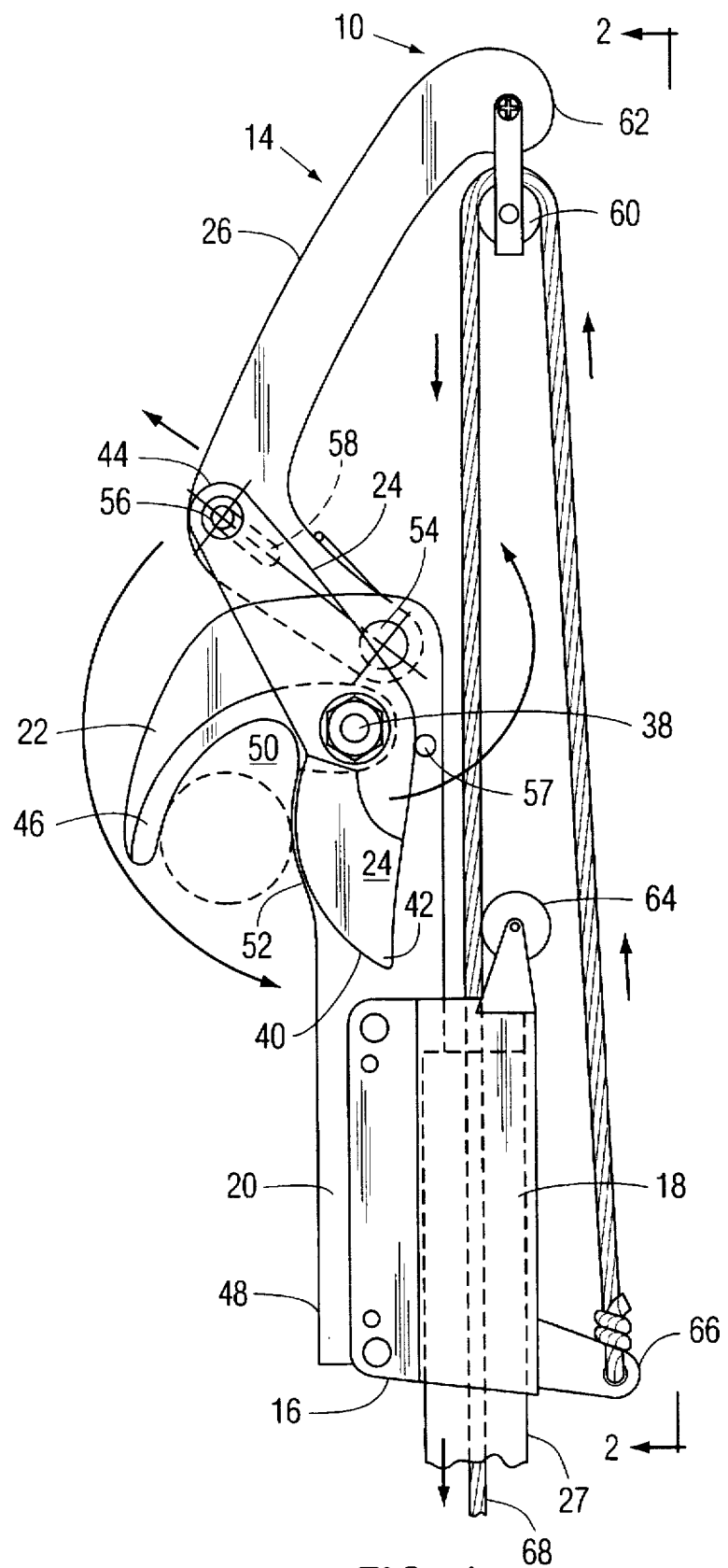
FIG. 1 is a partial front plan view of the pruning shears, showing details of the shearing mechanism located in a receiving position, in accordance with the invention.
Figure 6:
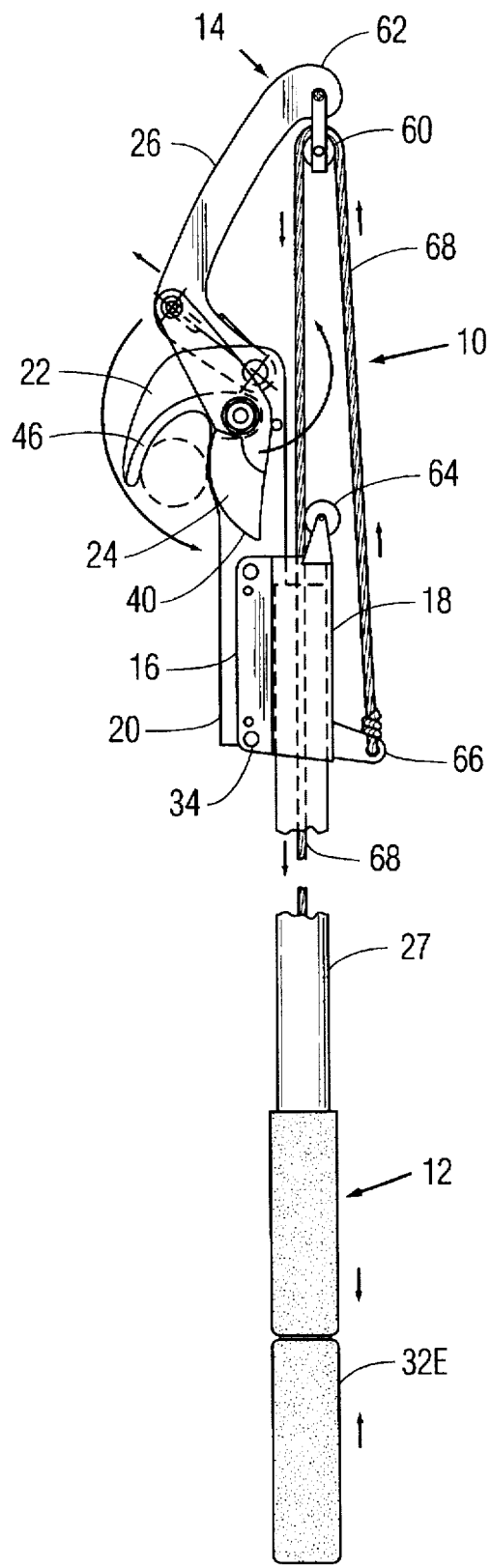
FIG. 6 is a partial plan view of the shearing mechanism and the handle portion, in accordance with the invention.

Referring to FIGS. 1 and 6, a pruning apparatus 10 in accordance with the invention is shown having a handle assembly 12, and a shearing mechanism 14. The shearing mechanism 14 includes a body 16 defining a tube 18 (which is open at both ends), a hook plate 20 having a hook 22, a cutting arm 24, and a leverage arm 26.

Figure 2:
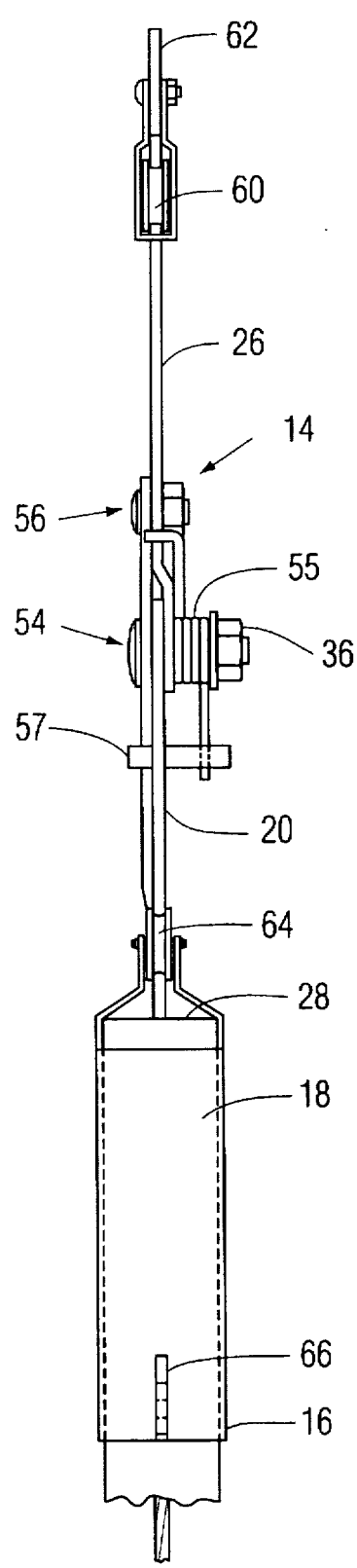
FIG. 2 is a side view of the shearing mechanism of FIG. 1, taken along the lines 2—2 of FIG. 1, in accordance with the invention.
Figure 3:
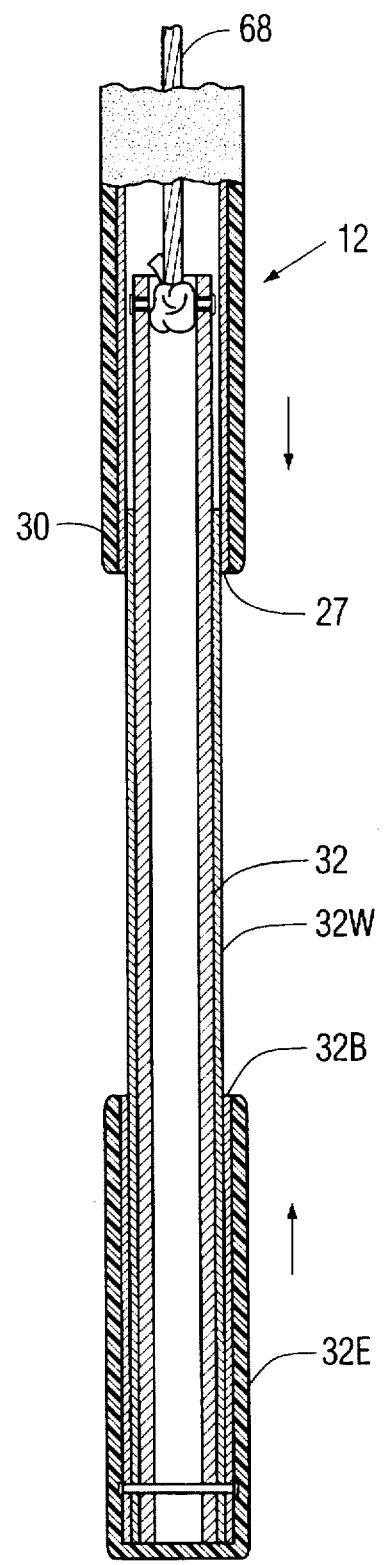
FIG. 3 is a section view of a handle portion, in accordance with the invention.

As shown in FIGS. 2 and 3, the handle assembly 12 includes a hollow shaft 27, defining a longitudinal axis and having an open upper end 28, a lower end 30, and a slidable grip portion 32. The slidable grip portion 32, further comprises an end grip 32E, fully opposite from the shearing mechanism 14, and may comprise a weighted sleeve 32W. The weighted sleeve 32W may be constructed of metal, wherein the majority of the other non-moving, non-cutting parts may be constructed of plastic. The metal components of the shearing mechanism 14 tend to make the pruning apparatus 10 top heavy. Thus, the weighted sleeve 32W helps balance the pruning apparatus 10 by counteracting the weight and rotational moments of shearing mechanism 14. Ideally, the weighted sleeve 32W is weighted so that the shearing mechanism 14 is responsive to the slightest effort by the user at the slidable grip portion 32. Thus, any effort or force expended by the user is translated into cutting power, and increased torque at the cutting blade helps increase the cutting arm 24. In addition, the end grip 32E may itself have an end grip weight 32B.

Figure 4:
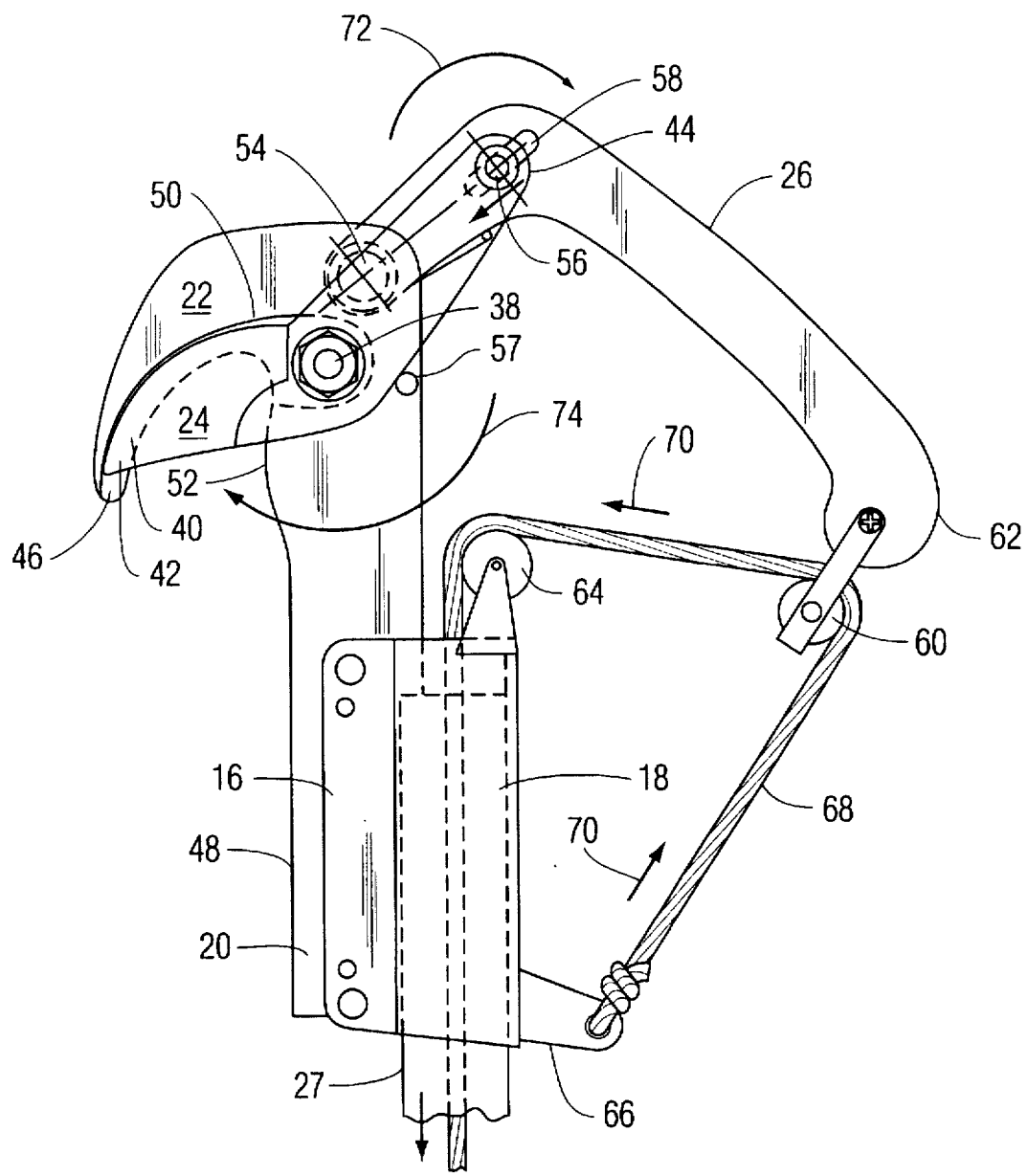
FIG. 4 is a partial plan view of the pruning shears, similar to the view of FIG. 1, showing the shearing mechanism in a fully cut position.

The shearing mechanism 14 is attached to the open upper end 28 of the hollow shaft 27. The open upper end 28 of the hollow shaft 27 is positioned within the tube 18 of the shearing mechanism 14 and held in place using appropriate fasteners or a conventionally known clamping action generated by controlled deformation of the tube 18. The hook plate 20 is firmly attached to the body 16 using an appropriate fastener 34, such as rivets or bolts. The cutting arm 24 is pivotally connected, using an appropriate bolt 36, to an upper portion of the hook plate 20 at a cutter pivot point 38 which is located adjacent to the hook 22, as seen in FIG. 1. The cutting arm 24 is pivotal between an open pre-cut position, as shown in FIG. 1, and a closed fully-cut position, as shown in FIG. 4. The cutting arm 24 is preferably held in the open position by a spring bias.

Also seen in FIGS. 1 and 4 is the cutting arm 24, which is attached to the hook plate 20 approximately at the middle of the cutting arm 24. The cutting arm 24 includes an outwardly curved cutting edge 40 which begins adjacent the middle of the blade and extends along one edge to a cutter end 42 of the cutting arm 24. Located opposite the cutter end 42 of the cutting arm 24 is a leverage end 44. The cutting arm 24 is preferably angled inwardly about the cutter pivot point 38 and towards the cutting edge 40 at a prescribed angle.

The hook 22 is preferably curved downwardly, as shown in FIG. 1, and includes an inwardly curved cutting edge 46. The downwardly curved hook 22 and accessible side 48 of the body 16 defines a receiving nook 50 which is adapted to receive a limb of interest. The exact size of the receiving nook 50 is dependent on the specific application of the pruning shears, i.e., the range of limbs intended to be pruned. Regardless, the shape of the cutting edge 46 mates (with a prescribed shearing overlap) with the outwardly curved cutting edge 40 of the cutting arm 24. Located along the accessible side 48 of the hook plate 20, and within the receiving nook 50, is an outwardly curved protrusion 52 which is adapted to outwardly force a captured limb into the cutting edge 46 of the hook 22 to assist in hold the limb in place prior to and during the shearing procedure. The protrusion 52 is aligned with and is shaped similar to the cutting edge 40 of the cutting arm 24 and further functions to effectively shield the cutting edge 40 when the cutting arm is located in the open position.

The leverage arm 26 is pivotally connected to the hook plate 20 at a leverage pivot point 54 which is adjacent to, but preferably not coaxial with the cutter pivot point 38. In accordance with the invention, the leverage pivot point 54 is located a prescribed distance from the cutter pivot point 38 and a greater distance from the receiving nook 50. A spring 55 is located at the leverage pivot point 54 and is adapted to bias the cutting arm 24 in its open position against a stop peg 57, as illustrated in FIG. 2.

The leverage end 44 of the cutting arm 24 is pivotally connected to the leverage arm 26, at a connecting point 56. The pivotal connection of the cutting arm 24 and the leverage arm 26 includes a slot 58 located within the leverage arm 26. The slot 58 is necessary to compensate for the unequal arcs of movement between the cutting arm 24 and the leverage arm 26, due to the displaced pivot points of the two arms. The leverage arm 26 is preferably outwardly angled, away from the cutting arm 24, at a prescribed angle.

A leverage pulley 60 is attached to a remote end 62 of the leverage arm 26 and aligns approximately with the longitudinal axis of the hollow shaft 27. A guide pulley 64 is operatively attached to the body 16, adjacent to the open upper end of the tube 18. An anchor arm 66 is attached to the body 16 opposite the hook plate 20, as shown in FIG. 1.

A cable 68 positioned within the hollow shaft 27 is attached to the slidable grip portion 32 shown in FIG. 3 and extends upwardly through the tube 18 of the body 16, around the leverage pulley 60 and is anchored to the anchor arm 66.

In operation, referring to FIG. 4, the user captures a limb within the receiving nook 50. Once the limb is positioned within the receiving nook 50, the user moves the slidable grip portion 32 with respect to the hollow shaft 27. The downward movement of the slideable grip portion 32 draws the cable 68 into the hollow shaft 27, as seen in FIGS. 3 and 6 and indicated by the arrows 70 in FIG. 4. The pulling of the cable 68 causes the leverage arm 26 to pivot about the leverage pivot point 54, as indicated by the arrow 72. The leverage pulley 60 introduces a leverage advantage to the pivoting of the leverage arm 26, as is well known in the art so that the force applied to the slidable grip portion 32 is effectively doubled in pulling down the leverage arm 26. It is important to note that one-handed operation is uniquely possible with the present invention.

As the leverage arm 26 pivots, the cutting arm 24 is forced to pivot about the cutter pivot point 38, as indicated by the arrow 74 in FIG. 4, against the spring bias from the spring 55. As soon as the leverage arm 26 and the leverage pulley 60 moves from alignment with the longitudinal axis, the cable 68 is "caught" and guided by the guide pulley 64. The resulting movement of the cutting arm 24 with respect to the hook 22 cuts the captured limb.

Figure 5:
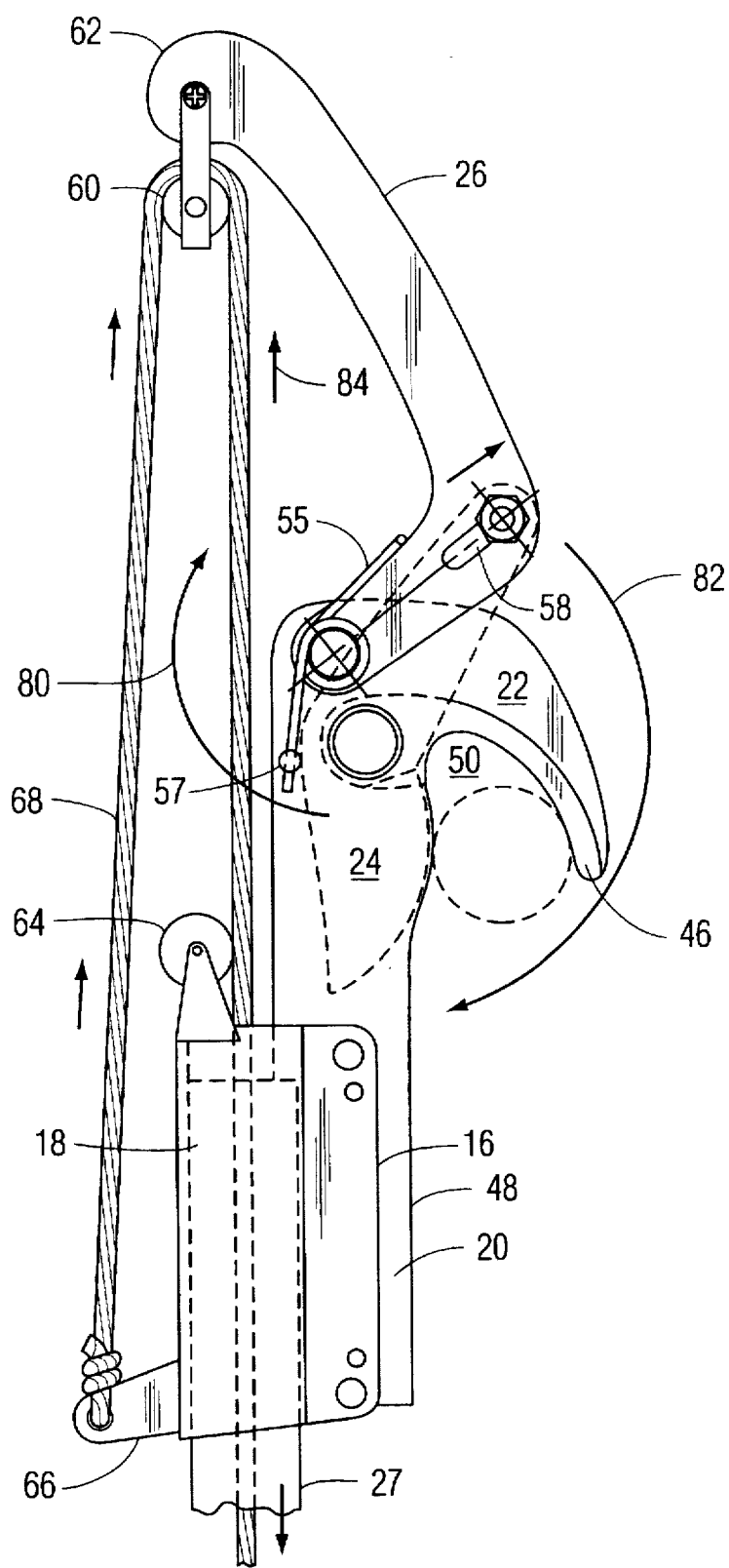
FIG. 5 is partial rear plan view of the shearing mechanism, showing the shearing mechanism in the receiving position, in accordance with the invention.

Once the limb is cut, the user releases the slidable grip portion 32. The spring 55 shown in FIG. 2 causes the cutting arm 24 to return to the open position, as indicated by the arrow 80, of FIG. 5, and the leverage arm 26 to move upwardly to its pre-cut position, as indicated by the arrow 82 in FIG. 5. The cable 68 similarly return to its pre-cut position, as shown by the arrows 84.

What is claimed is:

1. A portable pruner for cutting limbs, said pruner comprising:

a hollow shaft having a longitudinal axis, a lower end, an open upper end, and a slidable grip portion, said slidable grip portion being slidable along said longitudinal axis between a first and a second position;

a shearing mechanism attached to said open upper end of said hollow shaft, said shearing mechanism including a body having a hook adapted to receive and hold a limb, a cutting blade pivotally attached to said body and selectively pivotal against said hook to cut said limb;

a leverage arm which is pivotally connected to said body, said cutting blade is connected to a portion of said leverage arm so that pivotal movement of said leverage arm pivotally moves said cutting blade;

a pulley secured to said leverage arm; and a cable for moving said cutting blade with respect to said hook, having a first end and a second end, the first end connected to said slidable grip portion and the second end connected to said body, the leverage arm attached to said cable between the body and the slidable grip portion by the pulley so that movement of said slidable grip portion between said first and said second positions pivots said leverage arm and said cutting blade with respect to said hook, and wherein, said cutting blade is pivotally attached to said body at a first pivot, said leverage arm is pivotally attached to said body at a second pivot, said first pivot being located nearer to said hook than said second pivot and nearer said cable than said hook, said cutting blade comprising a leverage end portion extending from said first pivot to a location above said hook, said leverage end portion being coupled to said leverage arm, said leverage arm and said leverage end portion comprising a pin and slot assembly for coupling together at the location above said hook, said leverage arm and said leverage end portion, whereby said cutting blade and said leverage end portion are rotated with increasing leverage force as the pin and slot reduce the rotation force radius about said first pivot in response to rotation of said leverage arm about said second pivot.

2. A portable pruner according to claim 1, wherein said second pivot is located above and nearer said cable than said first pivot and said pulley is located generally above the longitudinal axis of said hollow shaft when the leverage arm is in the first position and substantially lateral to said hook when the leverage arm is in the second position.

3. A portable pruner according to claim 2, wherein the leverage arm when in the first position extends from said second pivot upward to the location above said hook and from said location above the hook upward toward a location above said hollow shaft, said pulley being attached to said leverage arm at a location generally above and along the longitudinal axis of said hollow shaft when the leverage arm is in the first position.

4. A portable pruner for cutting limbs, said pruner comprising:

a hollow shaft having a longitudinal axis, a lower end, an open upper end, and a slidable grip portion, said slidable grip portion being slidable along said longitudinal axis between a first and a second position;

a shearing mechanism attached to said open upper end of said hollow shaft, said shearing mechanism including a body having a hook adapted to receive and hold a limb, a cutting blade pivotally attached to said body and selectively pivotal against said hook to cut said limb;

a leverage arm which is pivotally connected to said body, said cutting blade is connected to a portion of said leverage arm so that pivotal movement of said leverage arm pivotally moves said cutting blade at an increased leverage;

a pulley secured to said leverage arm; and a cable for moving said cutting blade with respect to said hook, having a first end and a second end, the first end attached to said slidable grip portion and the second end attached to said body, the leverage arm attached to said cable between the body and the slidable grip portion by the pulley so that movement of said slidable grip portion between said first and said second positions increases the magnitude of force applied to the cutting blade and directly pivots said leverage arm and said cutting blade with respect to said hook.

5. A portable pruner according to claim 4, wherein said slidable grip portion comprises an upper shaft portion dimensioned to telescope longitudinally within said lower end of said hollow shaft and a bottom portion for remaining external to said lower end of said hollow shaft.

6. A portable pruner according to claim 5, wherein said cable extends internally through substantially the entire length of said hollow shaft.

7. A portable pruner according to claim 4, wherein said cable extends internally through substantially the entire length of said hollow shaft.

8. A portable pruner according to claim 7, wherein a guide member is connected in a relatively fixed position in relation to said open upper end of said hollow shaft for guiding the movement of said cable into and out of said open upper end.

9. A portable pruner according to claim 4, wherein said cutting blade is pivotally attached to said body at a first pivot, said leverage arm is pivotally attached to said body at a second pivot, said first pivot being located nearer to said hook than said second pivot.

10. A portable pruner according to claim 9, wherein said cutting blade comprises a leverage end portion extending from said first pivot away from said hook, said leverage end portion being coupled to said leverage arm.

11. A portable pruner according to claim 10, wherein said leverage arm and said leverage end portion comprise a pin and slot assembly for coupling together said leverage arm and said leverage end portion, whereby said cutting blade and leverage end portion are rotated with increasing leverage force as the pin and slot reduce the rotation force radius about said first pivot in response to rotation of said leverage arm about said second pivot.

12. A portable pruner for cutting limbs, said pruner comprising:

a shearing mechanism including a body having a hook adapted to receive and hold a limb, a cutting blade pivotally attached to said body and selectively pivotal against said hook to cut said limb;

a hollow shaft having a longitudinal axis, a lower end, an open upper end to which the shearing mechanism is attached, and a slidable grip portion slidable in said hollow shaft including a weighted sleeve for balancing the weight of the shearing mechanism, said slidable grip portion being slidable along said longitudinal axis between a first and a second position; and means for pivoting said cutting blade with respect to said hook, said pivoting means being responsive to movement of said slidable grip portion between said first and said second positions.

13. A portable pruner for cutting limbs, said pruner comprising:

a shearing mechanism including a body having a hook adapted to receive and hold a limb, a cutting blade pivotally attached to said body and selectively pivotal against said hook to cut said limb;

a hollow shaft having a longitudinal axis, a lower end, an open upper end to which the shearing mechanism is attached, and a slidable grip portion slidable in said hollow shaft including a weighted sleeve and a weighted end grip for balancing the weight of the shearing mechanism, said slidable grip portion being slidable along said longitudinal axis between a first and a second position; and means for pivoting said cutting blade with respect to said hook, said pivoting means being responsive to movement of said slidable grip portion between said first and said second positions.

14. A portable pruner for cutting limbs, said pruner comprising:

a hollow shaft having a longitudinal axis, a lower end, an open upper end, and a slidable grip portion, said slidable grip portion being slidable along said longitudinal axis between a first and a second position;

a shearing mechanism attached to said open upper end of said hollow shaft, said shearing mechanism including a body having a hook adapted to receive and hold a limb, a cutting blade pivotally attached to said body and selectively pivotal against said hook to cut said limb;

a leverage arm which is pivotally connected to said body, said cutting blade is connected to a portion of said leverage arm so that pivotal movement of said leverage arm pivotally moves said cutting blade;

a pulley secured to said leverage arm; and a cable for moving said cutting blade with respect to said hook, having a first end and a second end, the first end attached to said slidable grip portion and the second end attached to said body, the leverage arm attached to said cable between the body and the slidable grip portion by the pulley so that movement of said slidable grip portion between said first and said second positions pivots said leverage arm and said cutting blade with respect to said hook, said slidable grip portion comprises an upper shaft portion dimensioned to telescope longitudinally within said lower end of said hollow shaft and a bottom portion remaining external to said lower end of said hollow shaft.

15. A portable pruner according to claim 14, wherein said cable extends internally through substantially the entire length of said hollow shaft.

16. A portable pruner according to claim 15, wherein a guide member is connected in a relatively fixed position in relation to said open upper end of said hollow shaft for guiding the movement of said cable into and out of said open upper end.

17. A portable pruner according to claim 15, where in a guide member is connected in a relatively fixed position in relation to said open upper end of said hollow shaft for guiding the movement of said cable into and out of said open upper end.

18. A portable pruner according to claim 14, wherein said cutting blade is pivotally attached to said body at a first pivot, said leverage arm is pivotally attached to said body at a second pivot, said first pivot being located nearer to said hook than said second pivot.

19. A portable pruner according to claim 18, wherein said cutting blade comprises a leverage end portion extending from said first pivot away from said hook, said leverage end portion being coupled to said leverage arm.

20. A portable pruner according to claim 19, wherein said leverage arm and said leverage end portion comprise a pin and slot assembly for coupling together said leverage arm and said leverage end portion, whereby said cutting blade and leverage end portion are rotated with increasing leverage force as the pin and slot reduce the rotation force radius about said first pivot in response to rotation of said leverage arm about said second pivot.

21. A portable pruner according to claim 14, wherein said upper shaft portion comprises a hollow tube and said first end of said cable being connected to the interior of said hollow tube.

22. A portable pruner for cutting limbs, said pruner comprising:

a hollow shaft having a longitudinal axis, a lower end, an open upper end, and a slidable grip portion, said slidable grip portion being slidable along said longitudinal axis between a first and a second position;

a shearing mechanism attached to said open upper end of said hollow shaft, said shearing mechanism including a body having a hook adapted to receive and hold a limb, a cutting blade pivotally attached to said body and selectively pivotable against said hook to cut said limb;

a leverage arm pivotally connected to said body, said cutting blade being coupled to a portion of said leverage arm so that pivotal movement of said leverage arm pivotally moves said cutting blade;

a pulley mounted to said leverage arm; and a cable for moving said cutting blade with respect to said hook, said cable extending in operable engagement with said pulley, through said open upper end, through said hollow shaft and into engagement with said slidable grip portion, said cable being coupled to said shearing mechanism and said slidable grip portion so that movement of said slidable grip portion between said first and said second positions pivots said leverage arm and said cutting blade with respect to said hook.

* * * * *